April 24, 1951
H. CHORNEY
2,550,002
LAMINATED SKI
Filed July 29, 1947
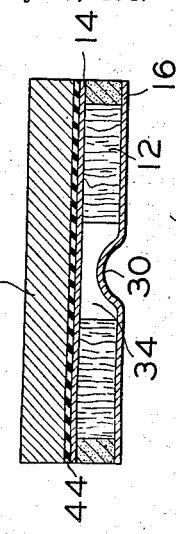
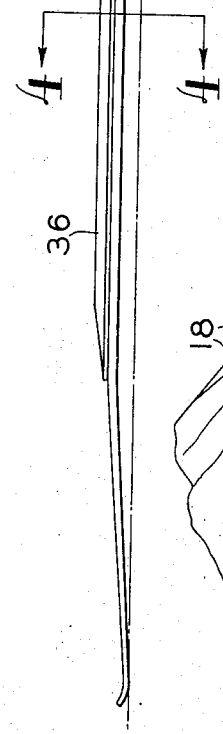
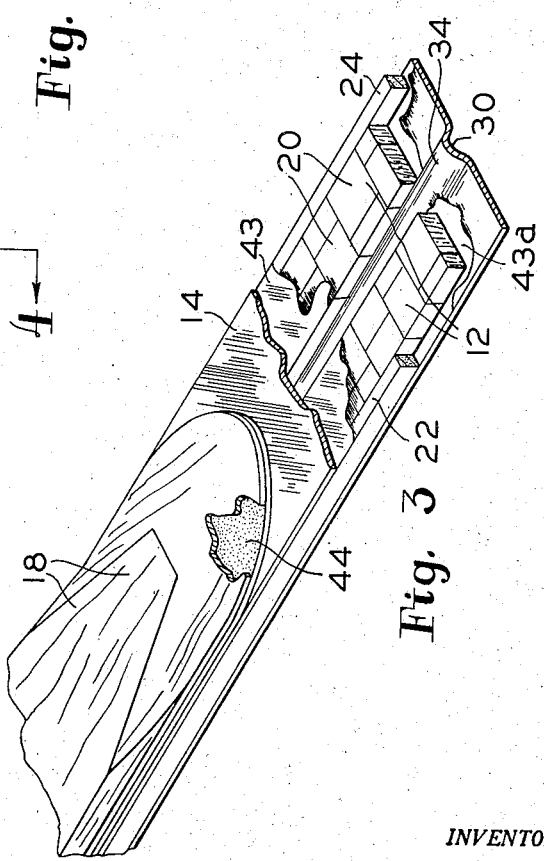
INVENTOR.
Harry Chorney
BY
M. B. Tasker
ATTORNEY.

Patented Apr. 24, 1951

2,550,002

UNITED STATES PATENT OFFICE 2,550,002

LAMINATED SKI

Harry Chorney, Stratford, Conn., assignor to United Aircraft Corporation, East Hartford, Conn., a corporation of Delaware Application July 29, 1947, Serial No. 764,349

1 Claim. (Cl. 280—11.13)

This invention relates to improvements in composite structures of laminated materials and to improvements in the method of making the same.

The invention has among its objects to provide an improved laminated structure, or sandwich, of the type in which materials having different expansion characteristics are united by thermo-setting adhesives.

In a laminated structure of the type in which a plurality of laminations are bonded to a core by thermo-setting resins, it is usual, in order to avoid distortion following bonding, to make a symmetrical structure relative to the core, i. e., an equal number of laminations of like stiffness and expansion characteristics on each side of the core.

It is an object of this invention to provide a non-symmetrical laminated structure of the type utilizing thermo-setting adhesives which is free from distortion following curing of the adhesives.

Another object of the invention is the provision of a laminated structure of this type having a resilient interlayer adhesively bonded between adjacent laminates of dissimilarly expanding materials.

A further object of the invention is generally to improve laminated skis and methods of making the same.

These and other objects and advantages of the invention will become apparent or will be particularly pointed out in the following detailed description of one embodiment of the invention which is shown in the acompanying drawings, by way of example, in connection with a laminated ski.

In these drawings:

Fig. 1 is a top plan view of a ski constructed in accordance with the invention;

Fig. 2 is a side elevation of the ski of Fig. 1;

Fig. 3 is an enlarged fragmentary, perspective view of the ski of Figs. 1 and 2 in the vicinity of the foot pad; and Fig. 4 is a sectional view on line 4—4 of Fig. 2.

The ski embodying this invention includes essentially a relatively thick core sheet 12, upper and lower facing sheets 14 and 16, respectively, and a rigid foot pad 18 which is bonded in an improved manner to the upper face of facing sheet 14 intermediate the length of the ski, and is an improvement on the ski shown in Patent No. 2,515,618 dated October 10, 1950 issued to Wayne M. Pierce.

As shown herein, the core sheet 12 is formed mainly of a plurality of adhesively connected sections 20 of end-grain balsa wood having a thickness along the grain equal to the space between the upper and lower surface sheets 14 and 16.

The core sheet also includes side strips 22 and 24 of harder material which extend along the outer side edges of the sheet and are adhesively secured to the balsa wood. These strips are notched into heel and toe caps 26 and 28 which are preferably of the same hard material as the side strips 22 and 24. The light, cellular balsa wood of the core sheet 12 is thus enclosed on all sides by the harder, more wear-resisting material of the side strips and end caps. The material of the side strips and caps may be hard wood such as maple or may be a phenolic resin material having good wear resisting qualities.

The facing sheets 14 and 16 are preferably thin sheets of hard aluminum alloy which are adhesively secured to the upper and lower faces of the core sheet. The lower facing sheet 16, as best shown in Figs. 3 and 4, has a central flute, or groove 30 formed therein which extends longitudinally of the ski from a point 32 (Fig. 1) rearwardly to the end of the ski to give directional stability to the ski. While the balsa wood portion of the core sheet may be correspondingly grooved to receive the flute 30, preferably a slot 34 is cut in the core sheet 12 extending from the rear end thereof to the point 32 into which the flute 30 projects.

The foot pad 18, which is a rigid block of wood, is adhesively secured to the upper surface of facing sheet 14 intermediate the ends of the ski by a thermo-setting resin which is preferably cured simultaneously with the curing of the resins by which the core and facing sheets are bonded. This pad is preferably of substantial thickness, enabling the fastenings of the harness to be screwed into the side walls thereof above the upper facing sheet 14 so that the fastenings do not extend into the core sheet of the ski proper. Foot pad 18 presents a flat bottom surface adjacent the facing sheet 14 and a flat top platform 36 and has faired end portions 38 and 40 which merge substantially into the plane of the upper surface of the facing sheet 14.

In making the ski the end-grain pieces 20, the strips 22, 24, and the end caps 26, 28 of balsa wood are first adhesively secured together to form the core sheet. The core sheet is then shaped to provide the variation in thickness desired in the ski from the rear end to the front end thereof. It will be noted that the core sheet where it meets the toe cap is relatively thick and tapers quite abruptly to the inner section 42 (Fig. 2) where the bend in the front end of the ski is made. The core then becomes increasingly thicker toward the intermediate portion of the ski which carries the foot pad 18 from which it tapers gradually to the heel cap 26.

When the core sheet has thus been shaped to give the desired thickness in the ski from end to end and the channel 34 has been cut therein, the core sheet is coated on both major surfaces with a suitable adhesive and assembled with the facing sheets 14 and 16 which are similarly coated on the surfaces adjacent the core sheet. The parts are then assembled so that, as shown in Fig. 3, there is a layer of adhesive 43 between the core and facing sheet 14 and a similar layer 43a between the core and facing sheet 16. The assembly is then placed in a mold having the desired shape to produce the required bend at the section 42 and the proper camber for the ski and is held forcibly against the mold surface until the adhesive has set or cured. Preferably the adhesive used is a thermo-setting resin and may be, for example, an adhesive of the phenol-formaldehyde type. The foot pad 18 is preferably adhesively secured to the upper face of the facing sheet 14 by a thermo-setting resin at the same time that the core and facing sheets are assembled and cured. It is with this adhesive connection of the foot pad 18 that this invention is principally concerned.

Due to the difference in expansion and contraction of the aluminum facing sheets 14 and 16 and the core sheet 20 stresses are set up in the ski following curing of the adhesives which tend to distort the ski but, since the laminations of the ski proper are symmetrical relative to the core sheet these forces neutralize each other. However, when the wood foot pad 18 is bonded to the upper facing sheet 14, surface stresses are set up in the ski following the bonding operation which tend to distort it.

In accordance with the present invention an interlayer 44 of rubber is interposed between the top surface of facing sheet 14 and the flat bottom surface of the foot pad 18 which is adhesively secured to both these surfaces. Preferably this thin sheet of rubber is of the 50 durometer type which has sufficient strength and other necessary properties to secure the wood foot pad securely to the metal when the rubber has been properly treated.

Treating the rubber sheet to get a good bond is accomplished by "cyclizing" the rubber which consists in placing the rubber sheet in a bath of concentrated sulphuric or nitric acid. Chemical reaction takes place between the acid and the surface of the rubber which leaves the surface of the rubber relatively hard and suitable for bonding to metal and wood surfaces. This "cyclizing" process requires placing the rubber sheet in the acid from ten to twenty minutes which is sufficient to harden the surface of the rubber without altering the center portion of the rubber sheet which retains its original resilient characteristics.

A number of adhesives are available with which to adhesively secure the surfaces of the rubber sheet to the wood foot pad and the aluminum facing sheet. One adhesive which has been found particularly suitable for the purpose is a two-part, thermo-setting adhesive consisting of phenol-aldehyde condensate used in conjunction with polyvinyl acetal resin in comminuted form as disclosed in Patent No. 2,499,134 dated February 28, 1950. The components of this adhesive are commercially manufactured by the Resinous Products Division of the Rohm and Haas Company, 222 W. Washington Square, Philadelphia, Pennsylvania under the name of "Redux."

Following curing of the thermo-setting adhesives beween the core sheet and the facing sheets and between the bottom surface of the foot pad and the top surface of the upper facing sheet, the differences in contraction of the pad 18 and the metal sheet 14 are absorbed by the rubber sheet 44 and the ski retains the shape imparted to it by the mold.

It will be evident that as a result of this invention it has been made possible to secure a plurality of laminations together by means of thermo-setting resins to form a non-symmetrical laminated body without the usual deformation of the finished article resulting from unequal contraction of the laminates comprising this structure. It will further be evident that it has been made possible to make a laminated ski, including a rigid foot pad bonded to the top surface thereof with a thermo-setting adhesive, which retains the shape of the mold following the curing process.

While the invention has been shown and described as incorporated in a ski it will be understood that this is only one of numerous applications to which the invention is adapted. It will also be understood that various changes may be made in the construction and arrangement of the parts without departing from the scope of the invention.

I claim:

A laminated ski having a core sheet including a central portion of low density material, portions of high density material at opposite ends thereof and side strips of high density material extending between said end portions, said core sheet varying in thickness between its ends to provide the desired variation in thickness of the ski, upper and lower facing sheets of high density material secured to said core sheet, a foot pad having a coefficient of expansion different from that of said facing sheets mounted on the top surface of said upper facing sheet, and a layer of resilient material interposed between the confronting surfaces of said pad and the adjacent facing sheet and adhesively bonded to both surfaces by a thermo-setting adhesive.

HARRY CHORNEY.

REFERENCES CITED

The following references are of record in the file of this patent:

UNITED STATES PATENTS

| Number | Name | Date |
|---|---|---|
| 1,578,415 | Ferris | Mar. 30, 1926 |
| 2,078,910 | Merrill | Apr. 27, 1937 |
| 2,264,535 | Klemm | Dec. 2, 1941 |
| 2,304,718 | Swart | Dec. 8, 1942 |
| 2,356,809 | Andreef | Aug. 29, 1944 |
| 2,389,641 | Sarbach | Nov. 27, 1945 |
| 2,398,890 | Howard | Apr. 23, 1946 |
| 2,415,881 | Heftler | Feb. 18, 1947 |
| 2,429,897 | Saunders | Oct. 28, 1947 |
| 2,479,342 | Gibbons | Aug. 16, 1949 |

FOREIGN PATENTS

| Number | Country | Date |
|---|---|---|
| 199,209 | Switzerland | Oct. 17, 1938 |
| 641,053 | Germany | Sept. 11, 1937 |
| 783,899 | France | Apr. 15, 1935 |

OTHER REFERENCES

Rose, "Adhesives for Metals and Non Metals," pages 959–963, of Metals and Alloys, Oct. 1944.